United States Patent
Roty (10) Patent No.: US 9,962,999 B2
(45) Date of Patent: May 8, 2018

(54) TREAD FOR PNEUMATIC TIRE

(75) Inventor: Gael Roty, Tokyo (JP)

(73) Assignees: COMPAGNIE GENERALE DES ETABLISSEMENTS MICHELIN (FR); MICHELIN RECHERCHE ET TECHNIQUES S.A. (CH)

( * ) Notice: Subject to any disclaimer, the term of this patent is extended or adjusted under 35 U.S.C. 154(b) by 661 days.

(21) Appl. No.: 14/385,844

(22) PCT Filed: Mar. 29, 2012

(86) PCT No.: PCT/JP2012/058340
§ 371 (c)(1),
(2), (4) Date: May 15, 2015

(87) PCT Pub. No.: WO2013/145204
PCT Pub. Date: Oct. 3, 2013

(65) Prior Publication Data
US 2015/0246586 A1 Sep. 3, 2015

(51) Int. Cl.
*B60C 11/13* (2006.01)
*B60C 11/24* (2006.01)
(Continued)

(52) U.S. Cl.
CPC ...... *B60C 11/1369* (2013.01); *B60C 11/0327* (2013.01); *B60C 11/042* (2013.01);
(Continued)

(58) Field of Classification Search
CPC . B60C 11/1369; B60C 11/24; B60C 11/1353; B60C 2011/1361
See application file for complete search history.

(56) References Cited

U.S. PATENT DOCUMENTS

2010/0243116 A1* 9/2010 Yasunaga ............... B60C 11/24
   152/154.2
2011/0259493 A1* 10/2011 Dautrey ................. B60C 11/13
   152/209.18
2013/0014872 A1* 1/2013 Dautrey .............. B60C 11/0309
   152/209.18

FOREIGN PATENT DOCUMENTS

JP    05-155203       6/1993
JP    10-250317 A     9/1998
(Continued)

OTHER PUBLICATIONS

Machine translation for Japan 2006-341655 (no date).*
(Continued)

*Primary Examiner* — Steven D Maki
(74) *Attorney, Agent, or Firm* — Dickinson Wright PLLC (57) ABSTRACT

A pneumatic tire tread that maintains a good level of water drainage performance up to the final stage of wear of a tread part formed with a plurality of flexible fences which are disposed inside at least one main groove extending from the bottom surface of the main groove and obstructing at least 70% of the cross-sectional area of the main groove, the flexible fences comprising an inside portion having a connecting part which is connected to the main groove, and an outside portion which is radially outside a predetermined height D1 from the bottom surface of the main groove, and the average angle of inclination of the inside portion with respect to a line perpendicular to the surface of the tread part in contact with the road surface is greater than the average angle of inclination of the outside portion.

8 Claims, 7 Drawing Sheets

(51) Int. Cl.
*B60C 11/04* (2006.01)
*B60C 11/03* (2006.01)

(52) U.S. Cl.
CPC .......... *B60C 11/1353* (2013.01); *B60C 11/24* (2013.01); *B60C 2011/1361* (2013.01)

(56) References Cited

FOREIGN PATENT DOCUMENTS

| JP | 2002-264614 A | * | 9/2002 |
| JP | 2005-053257 A | * | 3/2005 |
| JP | 2006-341655 | | 12/2006 |
| JP | 2006-341655 A | * | 12/2006 |
| KR | 2011-0064552 A | * | 6/2011 |

OTHER PUBLICATIONS

Machine translation for Japan 2005-053257 (no date).*
Machine translation for Japan 2002-264614 (no date).*
Machine translation for Korea 2011-0064552 (no date).*
International Search Report for PCT/JP2012/058340 dated Jun. 12, 2012.

* cited by examiner

TREAD FOR PNEUMATIC TIRE

This application claims benefit of the filing date of PCT/JP2012/058340, filed 29 Mar. 2012, the entire contents of which is incorporated herein by reference for all purposes.

BACKGROUND

Technical Field

The present disclosure relates to a pneumatic tire tread, and more specifically the present disclosure relates to a pneumatic tire tread with which air column resonance can be reduced by the formation of flexible fences in a tread main groove, and stable water drainage performance can be achieved up to the final stage of wear.

Description of Related Art

Air column resonance in a main groove formed in a tire tread is produced as a result of resonance (sympathetic vibration) inside a tube (air column) formed by the main groove and the road surface, and the resonant frequency thereof depends on the length of the air column formed between the main groove and the road surface.

This air column resonance sound manifests itself in the form of noise inside and outside the vehicle, and its peak is often at around 1 kHz, which readily reaches the human ear. According to known technology for reducing the air column resonance in a main groove, the air column resonance is reduced by obstructing the flow of air in the direction in which the main groove is formed, by providing members extending from the walls or bottom of the main groove in order to obstruct all or most of the groove. However, by providing this kind of member to obstruct the flow of air in the direction in which the main groove is formed, the flow of water penetrating into the main groove is also obstructed inside the main groove when the vehicle is travelling over a wet road surface and there is a reduction in the water drainage properties between the pneumatic tire and the road surface, so handling stability on a wet road surface is reduced.

In order to deal with this kind of problem in the prior art, FIG. 3 in Patent Document 1 shows technology which achieves both water drainage properties and reduced air column resonance by virtue of the fact that dividing walls 30 (flexible fences) extending from the bottom inside the main groove are disposed in such a way that the greater part thereof, starting from the main groove opening, does not come into contact with the groove walls.

Furthermore, FIG. 7 in Patent Document 2 shows technology which achieves both water drainage properties and reduced air column resonance by virtue of the fact that thin films 4 (flexible fences) extending from the bottom of the main groove are disposed in such a way as to lie at a maximum angle of 30° with respect to a line perpendicular to the groove bottom.

PATENT DOCUMENTS

Patent Document 1: JP 2006-341655 A
Patent Document 2: WO 2011/089107

SUMMARY

There are problems with the technology described in Patent Documents 1 and 2, however, in that as the depth decreases as a result of tread wear, the height of the flexible fences also decreases as a result of wear and the greater the reduction in this height, it becomes harder for the flexible fences to collapse even when subjected to water pressure, and the water drainage performance deteriorates proportionally. This reduction in water drainage performance conflicts with the intrinsic role of the flexible fences, namely to achieve both water drainage performance and a reduction in noise afforded by reduced air column resonance.

The present disclosure has therefore been devised in order to solve the abovementioned problems of the art, and the aim thereof lies in providing a pneumatic tire tread that makes it possible to achieve stable water drainage performance up to the final stage of wear, while also reducing air column resonance.

In order to achieve the abovementioned aim, the invention, in an embodiment, relates to a pneumatic tire tread comprising: a tread part which comes into contact with the road surface when the tire is rolling, in which is formed at least one main groove having a bottom surface and two opposing wall surfaces and having a depth D and a width W, and a plurality of flexible fences having a thickness E which extend inside the main groove in the radially outwards direction of the tire in such a way as to obstruct at least 70% of the cross-sectional area of the main groove and in such a way as to lie at a distance from the wall surfaces from the bottom surface of the main groove, the flexible fences being disposed at intervals such that at least one of said flexible fences is present inside the main groove within the tread footprint when the tire is rolling, the pneumatic tire tread being characterized in that the plurality of flexible fences comprise an inside portion having an end edge part which is connected to the bottom surface of the main groove, and an outside portion which is radially outside a predetermined height D1 from the bottom surface of the main groove, and the average angle of inclination of the inside portion with respect to a line perpendicular to the surface of the tread part in contact with the road surface is greater than the average angle of inclination of the outside portion with respect to a line perpendicular to the surface of the tread part in contact with the road surface, when viewed in cross section parallel to the direction in which the main groove extends and on a plane perpendicular to the surface of the tread part in contact with the road surface.

According to an embodiment of the invention having the configuration described above, first of all, the flexible fences which are formed inside the main groove extending from the bottom surface of the main groove in the radially outwards direction of the tire and obstructing at least 70% of the cross-sectional area of the main groove make it easier for the peak of the air column resonance to be shifted outside the frequency band which readily reaches the human ear by altering the length of an air column formed between the main groove and the road surface compared with the case in which flexible fences are not formed, and as a result noise produced by air column resonance is improved.

In addition, according to an embodiment of the invention, the flexible fences comprise an inside portion having an end part which is connected to the bottom surface of the main groove, and an outside portion which is further outside in the radial direction of the tire than a predetermined height D1 (where D1 is less than D) from the bottom surface of the main groove, and the average angle of inclination of the inside portion with respect to a line perpendicular to the surface of the tread part in contact with the road surface is greater than the average angle of inclination of the outside portion with respect to a line perpendicular to the surface of the tread part in contact with the road surface, so the flexible fences can readily collapse under the pressure of water penetrating into the main groove, and as a result it is possible to maintain the water drainage properties of the main groove.

Furthermore, the water drainage properties of the main groove can be maintained up to the final stage of wear of the tread part. That is to say, the inside portion of the flexible fences having a greater average angle of inclination than the outside portion is able to collapse more readily under water pressure, and therefore it is possible to ensure ease of collapse even when the height of the flexible fences decreases as wear progresses. As a result, it is possible to maintain water drainage properties up to the final stage of wear.

Figure 10:
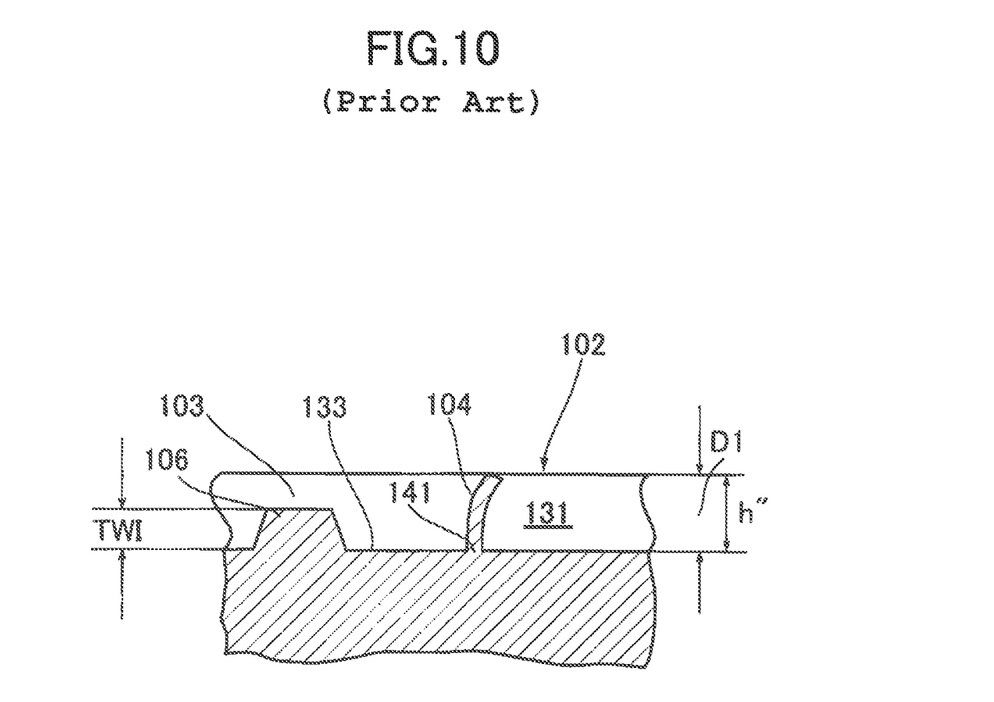
FIG. 10 is an enlargement in cross section of a conventional pneumatic tire tread, schematically showing the state of conventional flexible fences during travel on a wet road surface when the depth of the tread part is approximately 60% worn.

Here, assuming that the average angle of inclination of the whole of the flexible fence is set to the same angle as the average angle of inclination of the outside portion defined by the present invention (the flexible fences also include a conventional part which is provided in such a way as to extend at right angles to the surface of the tread part in contact with the road surface), the predetermined height D1 from the bottom surface of the main groove refers to the height at which the flexible fences whereof the height has decreased due to wear no longer readily collapse under the pressure of water penetrating into the main groove when the height of the flexible fences has been reduced as a result of wear (see FIG. 10, for example). It is therefore possible to maintain the water drainage properties of the main groove up to the final stage of wear by making the average angle of inclination of the inside portion with respect to a line perpendicular to the surface of the tread part in contact with the road surface greater than the average angle of inclination of the outside portion with respect to a line perpendicular to the surface of the tread part in contact with the road surface (see FIG. 5, for example). Here, the predetermined height D1 is varied and appropriately set in accordance with changes in the thickness E of the flexible fences 4, the material thereof, and the width W and depth D of the main groove 3 in which the flexible fences 4 are provided.

Here, "groove" refers to a space having a width and a depth and constructors by connecting two opposing surfaces (wall surfaces) which under normal usage conditions do not come into contact with each other, by means of another surface (a bottom surface).

Furthermore, "main groove" refers to a groove that is predominantly responsible for draining fluids and is relatively wide among the various grooves that are formed in the tread. In many cases "main groove" means a groove which extends in the circumferential direction of the tire in a linear, zigzag or undulating fashion, but relatively wide grooves which extend at an angle to the direction of rotation of the tire and are predominantly responsible for drainage of fluids are also included.

Furthermore, "tread footprint" refers to a surface region of the tread that is in contact with the road surface when the tire is mounted on an applicable rim, as defined in the industrial standards mentioned below, and inflated to its nominal pressure and a nominal load is applied thereto.

Furthermore, "standards" are those that are defined by the industrial standards in force in the region in which the tire is manufactured or used. Examples of industrial standards are: in Europe, the ETRTO (The European Tire and Rim Technical Organisation) "Standards Manual"; in the USA, the TRA (the Tire and Rim Association, Inc.) "Year Book"; and in Japan, the Japan Automobile Tire Manufacturers Association (JATMA) "JATMA Year Book". Furthermore, "applicable rim" refers to a rim stipulated in these standards according to the size of the tire, "nominal pressure" refers to the air pressure stipulated in these standards corresponding to the load-carrying capacity, and "nominal load" refers to the maximum mass with which the tire is permitted to be loaded according to these standards.

Furthermore, "average angle of inclination" refers to the angle of a straight line joining two end points of the inside portion or outside portion of the flexible fences, with respect to a line perpendicular to the surface of the tread in contact with the road surface. When the straight line joining the two end points is parallel to a line perpendicular to the surface of the tread in contact with the road surface the average angle of inclination is 0°, and when said straight line is orthogonal to said perpendicular line the average angle of inclination is 90°.

Preferably, according to an embodiment of the invention, the average angle of inclination of the inside portion of the flexible fences with respect to a line perpendicular to the surface of the tread part in contact with the road surface is greater than 60°.

According to an embodiment of the invention configured in the manner described above, it is possible to maintain water drainage properties while reducing air column resonance, and the water drainage properties can be reliably maintained up to the final stage of wear of the tread part. That is to say, if the average angle of inclination of the inside portion of the flexible fences is less than 60°, it is difficult to adequately maintain the ease of collapse of the flexible fences under water pressure when the height of the flexible fences decreases as a result of wear of the tread part, and there is a risk of the water drainage properties deteriorating as wear of the tread part progresses. Accordingly, if the average angle of inclination of the inside portion of the flexible fences is made greater than 60°, it is possible to maintain the water drainage properties while reducing air column resonance, and the water drainage properties can be maintained up to the final stage of wear of the tread part.

Preferably, according to an embodiment of the invention, the predetermined height D1 from the bottom surface of the main groove is less than 50% of the depth D.

According to an embodiment of the invention configured in the manner described above, it is possible to maintain water drainage properties while reducing air column resonance, and the water drainage properties can be reliably maintained up to the final stage of wear of the tread part. That is to say, although the water drainage properties at the final stage of wear can be maintained if the predetermined height D1 from the bottom surface of the main groove is greater than 50% of the depth D of the main groove, it becomes difficult to achieve the effect of reducing air column resonance afforded by obstructing the flow of air inside the main groove over the whole of the flexible fences including the outside portion, so there is a risk that it will be difficult to achieve both the effect of reducing the air column resonance and the effect of maintaining water drainage properties at the final stage of wear of the tread part.

Furthermore, if the predetermined height D1 from the bottom surface of the main groove is greater than 50% of the depth D of the main groove, the length of the flexible fences increases in the direction in which the main groove extends due to the fact that the average angle of inclination of the inside portion is greater than the average angle of inclination of the outside portion, and it is difficult to release the tire from the mold when the flexible fences are produced, so there is a risk of deterioration in the productivity of such a tire.

Accordingly, if the predetermined height D1 from the bottom surface of the main groove is less than 50% of the depth D of the main groove, it is possible to maintain more reliably both the effect of reducing air column resonance and the effect of maintaining water drainage properties up to the final stage of wear.

Preferably, according to an embodiment of the invention, the predetermined height D1 from the bottom surface of the main groove is set in such a way as to satisfy the relationship D1≤TWI+1 mm, where TWI is the height of a wear indicator formed on the bottom surface of the main groove in order to indicate the wear limit.

According to an embodiment of the invention configured in the manner described above, it is possible to maintain water drainage properties while reducing air column resonance, and the water drainage properties can be reliably maintained up to the final stage of wear of the tread part. That is to say, although the water drainage properties at the final stage of wear can be maintained if the predetermined height D1 from the bottom surface of the main groove is greater than the height of the wear indicator TWI+1 mm, it becomes difficult to achieve the effect of reducing air column resonance afforded by obstructing the flow of air inside the main groove over the whole of the flexible fences including the outside portion, so there is a risk that it will be difficult to achieve both the effect of reducing the air column resonance and the effect of maintaining water drainage properties at the final stage of wear of the tread part.

Furthermore, if the predetermined height D1 is greater than the height of the wear indicator TWI+1 mm, the length of the flexible fences increases due to the fact that the average angle of inclination of the inside portion is greater than the average angle of inclination of the outside portion, and it is difficult to release the tire from the mold when the flexible fences are produced, so there is a risk of deterioration in the productivity of such a tire.

Accordingly, if the predetermined height D1 from the bottom surface of the main groove is set in such a way as to satisfy the relationship D1≤TWI+1 mm, where TWI is the height of the wear indicator formed on the bottom surface of the main groove in order to indicate the wear limit, it is possible to maintain the water drainage properties while also maintaining productivity and reducing air column resonance, and the water drainage properties can be more reliably maintained up to the final stage of wear of the tread part.

Here, the "wear indicator" refers to a step-like portion, also known as a "slip sign" etc., which is provided on part of the bottom surface of the main groove in such a way as to reduce the depth. The wear indicator indicates the wear usage limit (wear limit) of the tire and the height of the step-like portion and the height of the tread part become equal when wear of the tread part progresses, whereby part of the main groove becomes visible as an interruption. The height TWI of the step-like portion from the bottom surface of the main groove is generally 1.6 mm in the case of a passenger vehicle tire, a light truck tire and a truck/bus tire. It should be noted that the wear indicator may also be provided in a groove other than the main groove.

Preferably, according to an embodiment of the invention, the average angle of inclination of the outside portion of the flexible fences with respect to a line perpendicular to the surface of the tread part in contact with the road surface is less than 30°.

According to an embodiment of the invention configured in the manner described above, it is possible to more reliably obstruct the flow of air in the main groove, especially in a new product, up to the initial stage of wear or an intermediate stage of wear, and it is also possible to more reliably maintain the ease of collapse of the outside portion of the flexible fences under the pressure of water inside the main groove, so the water drainage properties can be maintained while air column resonance is reduced, and the water drainage properties can be maintained up to the final stage of wear of the tread part.

Preferably, according to an embodiment of the invention, the tread part has a defined direction of rotation, and the inside portion of the flexible fences is formed in such a way that the height thereof in the radial direction of the tire with respect to the bottom surface of the main groove increases from the front side towards the rear side in the given direction of rotation of the tread part.

According to an embodiment of the invention configured in the manner described above, the direction of fluid flow through the main groove during travel is the same as the direction of collapse of the inside portion of the flexible fences, so it is possible to more reliably maintain the ease of collapse of the inside portion of the flexible fences at the final stage of wear of the tread part in particular.

Preferably, according an embodiment of to the invention, the outside portion of the flexible fences is formed in such a way that the height thereof in the radial direction of the tire with respect to the bottom surface of the main groove increases from the front side towards the rear side in the given direction of rotation of the tread part.

According to an embodiment of the invention configured in the manner described above, the direction of fluid flow through the main groove is the same as the direction of collapse of the outside portion of the flexible fences, so it is possible to more reliably maintain the ease of collapse of the outside portion of the flexible fences.

Preferably, according to an embodiment of the invention, the average angle of inclination of the outside portion of the flexible fences with respect to a line perpendicular to the surface of the tread part in contact with the road surface is 0°.

According to an embodiment of the invention configured in the manner described above, the outside portion of the flexible fences which is formed in such a way that the average angle of inclination is 0° makes it possible to most effectively restrict generation of air column resonance, so the water drainage properties can be more reliably maintained while air column resonance is reduced.

Preferably, according to an embodiment of the invention, a plurality of recessed parts having an opening which opens at the main groove are further formed in the bottom surface of the main groove, and the inside portion of the plurality of flexible fences is formed in such a way as to be connected to the plurality of recessed parts on the bottom surface of the main groove and in such a way as to extend into the main groove through the opening of the recessed parts.

According to an embodiment of the invention configured in the manner described above, it is possible to make the connecting part of the inside portion of the flexible fences lower than the bottom surface of the main groove, so the opening proportion in the cross section of the main groove when the flexible fences have collapsed under the pressure of fluid inside the main groove can be increased, and as a result the water drainage properties are more reliably maintained and the water drainage properties can be maintained until the final stage of wear of the tread part, while air column resonance is reduced.

Preferably, according to an embodiment of the invention, the thickness E of the flexible fences is between 0.3 mm and 2.0 mm.

According to an embodiment of the invention configured in the manner described above, it is possible to maintain water drainage properties while reducing air column resonance, and the water drainage properties can be maintained up to the final stage of wear. That is to say, if the thickness of the flexible fences is less than 0.3 mm, the flexible fences collapse under air pressure due to a reduction in dimensional strength thereof and there is a risk of a reduction in the effect of reducing air column resonance. On the other hand, if the thickness of the flexible fences is greater than 2.0 mm, the proportion of cross-sectional opening in the main groove when the flexible fences collapse inside the main groove is reduced so there is a risk of deterioration of the water drainage properties.

By virtue of the pneumatic tire tread according to an embodiment of the invention it is possible to maintain the water drainage performance up to the final stage of wear of the tread part while reducing air column resonance and maintaining water drainage performance.

DETAILED DESCRIPTION OF SPECIFIC EMBODIMENTS

Preferred modes of embodiment of the invention will be described below with reference to the figures.

The pneumatic tire tread according to a first mode of embodiment of the invention will be described first of all with the aid of FIG. 1 to 3.

Figure 1:
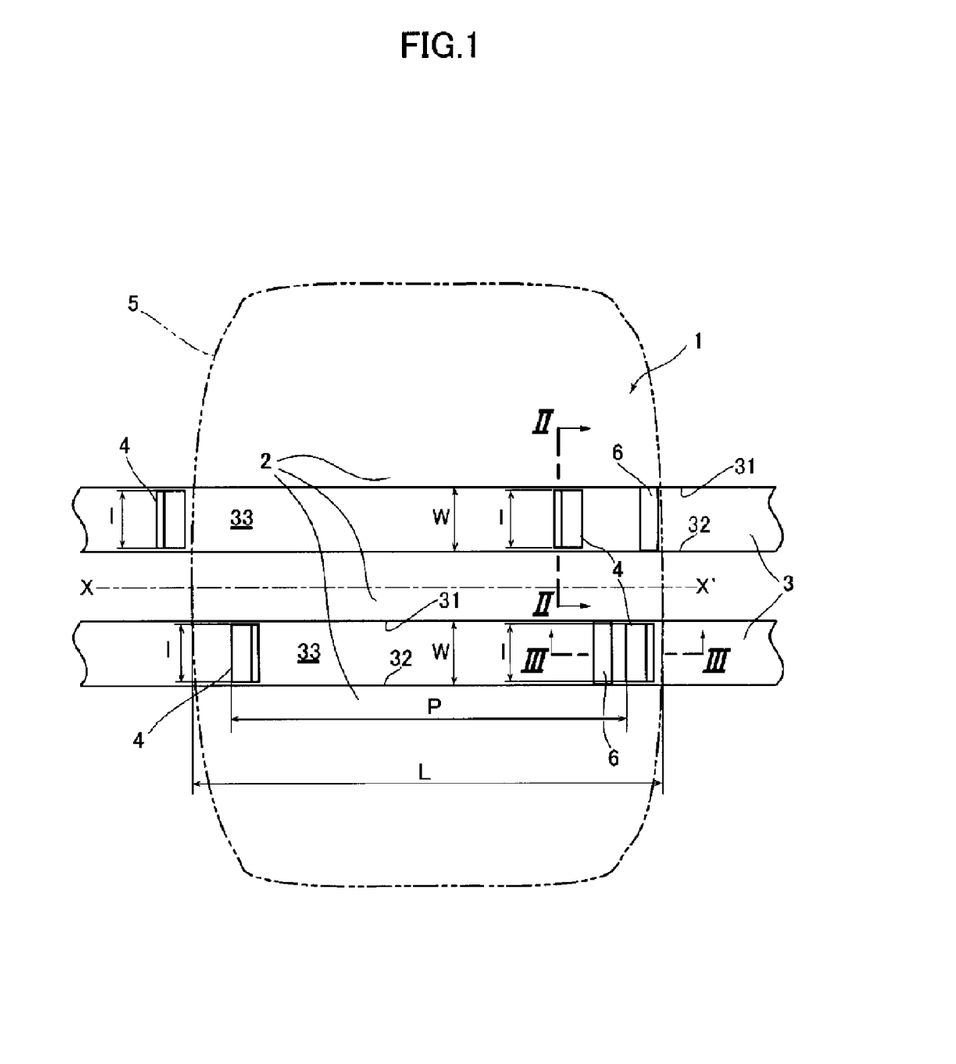
FIG. 1 schematically shows the pneumatic tire tread according to a first mode of embodiment of the invention.
Figure 2:
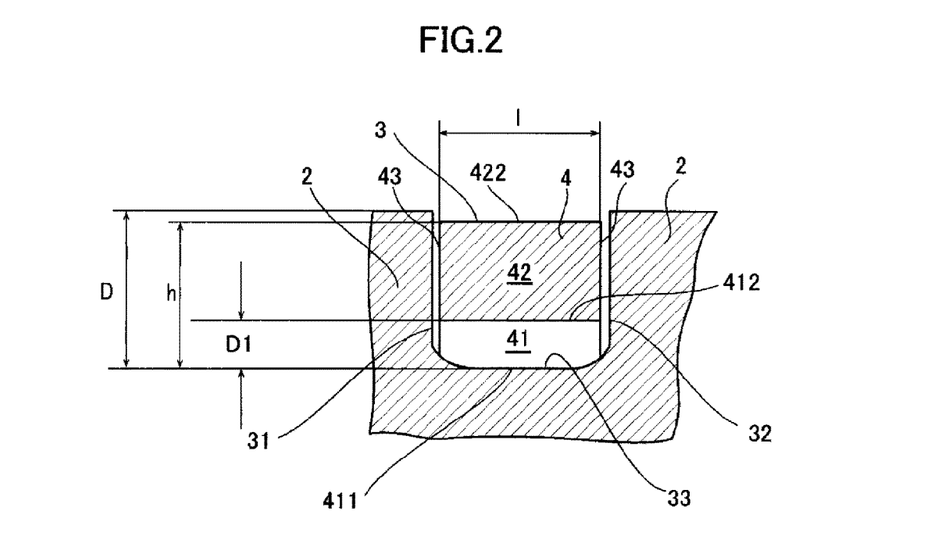
FIG. 2 is an enlargement in cross section to illustrate the flexible fences of the pneumatic tire tread seen along the line II-II in FIG. 1.
Figure 3:
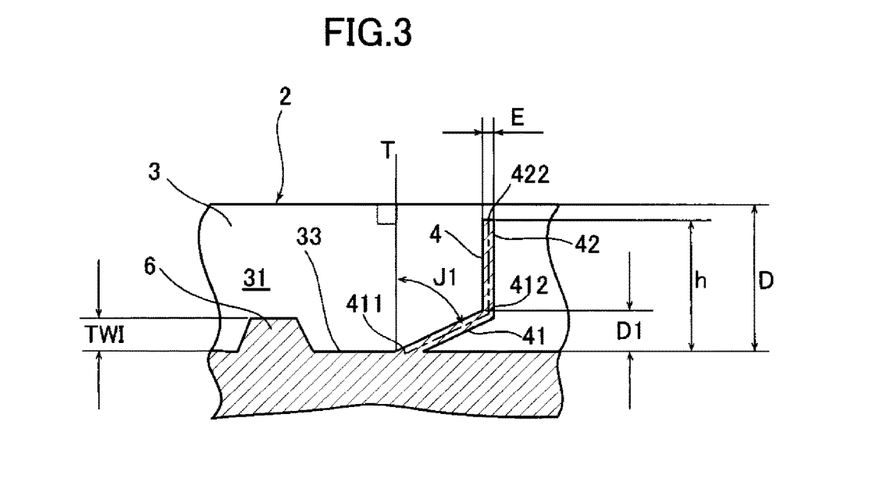
FIG. 3 is an enlargement in cross section to illustrate the flexible fences of the pneumatic tire tread seen along the line III-III in FIG. 1.

FIG. 1 schematically shows the pneumatic tire tread according to the first mode of embodiment of the invention, FIG. 2 is an enlargement in cross section of the pneumatic tire tread seen along the line II-II in FIG. 1, and FIG. 3 is an enlargement in cross section of the pneumatic tire tread seen along the line III-III in FIG. 1.

First of all, as shown in FIG. 1, the reference symbol 1 denotes a pneumatic tire according to this mode of embodiment, the pneumatic tire 1 comprising a tread part 2, and two main grooves 3 having a width W and extending in the tire circumferential direction indicated by XX' are formed in the tread part 2. The main groove 3 has three surfaces, namely opposing wall surfaces 31, 32 and a bottom surface 33, and a step-like wear indicator 6 (see FIG. 3) provided in such a way as to reduce the depth of the main groove is formed on the bottom surface 33. It should be noted that the tire size in this example is 225/55R16 and the tire rotation direction of the tread part 2 is undefined. According to this mode of embodiment, the width W of the main groove 3 is 14.5 mm.

This figure shows the tread footprint 5 and the tread footprint length L when the tire is inflated to the nominal pressure and the nominal load is applied. It should be noted that according to the "ETRTO Standard Manual 2011" the applicable rim for this size is 7J, the nominal pressure is 250 kPa, and the nominal load is 690 kg, and in this embodiment the footprint length L is 143 mm.

Here, while the tire is rolling, the main grooves 3 passing through the tread footprint 5 form an air column with the road surface and the resonant frequency of the main grooves 3 depends on the length of the air column formed in this way. According to this mode of embodiment, the flexible fences 4 having the width 1 are provided inside the main grooves 3 in order to change the frequency of the air column resonance by changing the length of the air column, as shown in FIG. 1 to 3. As shown in FIG. 1, the installation spacing P of the flexible fences 4 formed inside the same main groove 3 is provided in such a way as to be a shorter distance than the footprint length L, so that at least one flexible fence is always present inside the footprint 5 of the main grooves 3 when the tire is rolling. Furthermore, the wear indicator 6 provided in the main groove 3 is formed in the shape of a step having a height such as to indicate the wear limit of the tire. In this mode of embodiment, the width 1 of the flexible fences 4 is 13.5 mm.

Next, as shown in FIGS. 2 and 3, the flexible fences 4 comprise an inside portion 41 which has a connecting part (end edge part) 411 connecting to the bottom surface 33 of the main groove 3 and extends at a predetermined angle from the connecting part 411, and an outside portion 42 which extends at a predetermined angle in the radially outwards direction from a height D1 (predetermined height D1) from the bottom surface 33 of the main groove 3. As shown in FIG. 3, the flexible fences 4 are provided in such a way as to face outwards in the radial direction of the tire (the direction perpendicular to the rotational axis of the tire) essentially over the entirety thereof. Furthermore, as shown in FIG. 2, side surface parts 43 on both sides of the flexible fences 4 are provided in such a way that the entirety thereof, excluding the connecting part 411 which connects to the bottom surface 33 of the main groove 3, lies at a predetermined distance from the opposing wall surfaces 31, 32 of the main groove 3.

As shown in FIG. 1, the flexible fences 4 are formed in such a way that the direction of the width 1 thereof runs perpendicular to the direction in which the main groove 3 runs. As shown in FIGS. 2 and 3, the inside portion 41 and outside portion 42 of the flexible fences 4 have the above-mentioned width 1 and a thickness E. As shown in FIG. 3, the flexible fence 4 has a substantially constant thickness E.

Furthermore, as shown in FIG. 2, the flexible fences 4 have an essentially rectangular shape (seen in plan view) viewed from the longitudinal direction of the main groove 3, and as shown in FIGS. 2 and 3, the flexible fences 4 have a height h which is slightly less than the depth D of the main groove 3.

The flexible fences 4 are formed in such a way as to obstruct at least 70% of the cross-sectional area of the main groove 3, and are formed in such a way as to collapse under the water pressure mainly imparted by a fluid such as water flowing through the main groove 3. In this mode of embodiment, the depth D of the main groove 3 is 8.0 mm, the height h of the flexible fences 4 is 7.0 mm, and the thickness E of the flexible fences 4 is 0.6 mm, the flexible fences 4 obstructing about 87% of the cross-sectional area of the main groove 3. Furthermore, the height TWI of the wear indicator 6 is 1.6 mm.

It should be noted that the flexible fences 4 in the example of a tire given in this mode of embodiment may be endowed with a shape having a height h at least equal to about 5.6 mm in such a way as to obstruct at least 70% of the cross-sectional area of the main groove 3. Moreover, the invention is not limited to the example in this mode of embodiment and if the width W and depth D of the main groove 3 are varied, the height h of the flexible fences 4 should also be changed accordingly in order to obstruct at least 70% of the cross-sectional area of the main groove 3.

The inside portion 41 and outside portion 42 of the flexible fences 4 will be described in detail next.

First of all, when the inside portion 41 of the flexible fences 4 shown in FIG. 3 is viewed in cross section parallel to the direction in which the main groove 3 extends and on a plane perpendicular to the surface 5 of the tread part 2 in contact with the road surface, a straight line joining the connecting part (first end point) 411 which connects to the bottom surface 33 of the main groove 3, and a point (second end point) 412 extending from the connecting part 411 into the main groove 3 where the flexible fences 4 reach the height D1 (predetermined height D1) from the bottom surface 33 of the main groove 3 has a first average angle of inclination J1 with respect to a line T perpendicular to the surface of the tread part 2 in contact with the road surface.

Furthermore, when the outside portion 42 of the flexible fences 4 is viewed in cross section in the same way in FIG. 3, a straight line joining the second end point 412 of the flexible fences 4 at the height D1 from the bottom surface 33 of the main groove 3, and an outermost end part (third end point) 422 of the outside portion 42 of the flexible fences 4 in the radial direction of the tire has a second average angle of inclination (J2) (0°) which is the same as the angle of the line T perpendicular to the surface of the tread part 2 in contact with the road surface (0°).

According to this mode of embodiment, the height D1 from the bottom surface 33 of the main groove 3 (predetermined height D1) is 2.2 mm, which is less than 50% of the depth D of the main groove 3 and satisfies the relationship D1≤TWI+1 mm with respect to the height TWI of the wear indicator, and the first average angle of inclination J1 of the inside portion 41 of the flexible fences 4 is 65°.

Here, if it is assumed that the flexible fences 4 do not have the inside portion 41 and the outside portion 42 extends as far as the bottom surface 33 of the main groove 3, the height D1 from the bottom surface 33 of the main groove 3 is the height at which the flexible fences 4 do not readily collapse under water pressure generated mainly by a fluid such as water passing through the main groove 3 when the height of the flexible fences 4 has been reduced as a result of wear. In other words, assuming that the average angle of inclination of the whole of the flexible fence is set at the same angle as the second average angle of inclination J2 of the outside portion 42 defined in this mode of embodiment (the flexible fences also include a conventional part which is provided in such a way as to extend at right angles (an angle parallel to the line T perpendicular to the surface of the tread part 2 in contact with the road surface) to the surface of the tread part in contact with the road surface), the predetermined height D1 from the bottom surface of the main groove refers to the height at which the flexible fences whereof the height has decreased due to wear no longer readily collapse under the pressure of water penetrating into the main groove when the height of the flexible fences has been reduced as a result of wear (see FIG. 10, for example; to be described later). The height D1 should be varied in accordance with the thickness E of the flexible fences 4, the material thereof, and the width W and depth D of the main groove 3 in which the flexible fences 4 are provided, and is appropriately set at the design stage of the pneumatic tire tread.

In this mode of embodiment, the flexible fences 4 are made of the same material as the tread part 2 of the pneumatic tire 1. It should be noted however that the flexible fences 4 may be made of a different material from that of the tread part 2.

The main action and effect of the pneumatic tire tread according to the first mode of embodiment of the present invention will be described next.

In this mode of embodiment, the flexible fences 4 comprise the outside portion 42 and the inside portion 41 having the average angle of inclination J1 which is greater than the average angle of inclination J2 of the outside portion 42. Therefore, even if wear progresses and the height of the flexible fences 4 is reduced, the same effect can be achieved as when the average angle of inclination J1 of the inside portion 41 is large, in other words when the flexible fences 4 are collapsed in advance, so when wear progresses, the flexible fences 4 can adequately collapse under the water pressure mainly generated by a fluid such as water passing through the main groove 3, and it is possible to more reliably maintain the water drainage properties of the main groove 3 until the final stage of wear, while reducing air column resonance.

The situation when the pneumatic tire tread according to the first mode of embodiment of the present invention is travelling on a wet road surface will be described next with the aid of FIG. 4 and FIG. 5.

Figure 4:
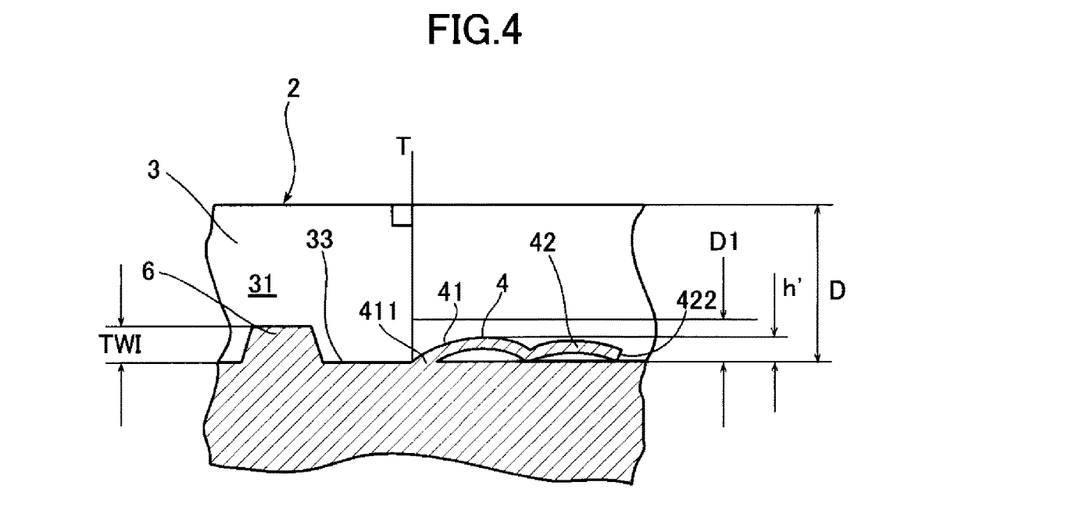
FIG. 4 is an enlargement in cross section of the pneumatic tire tread seen along the line III-III in FIG. 1 (the same view as in FIG. 3) schematically showing the state of the flexible fences during travel on a wet road surface.
Figure 5:
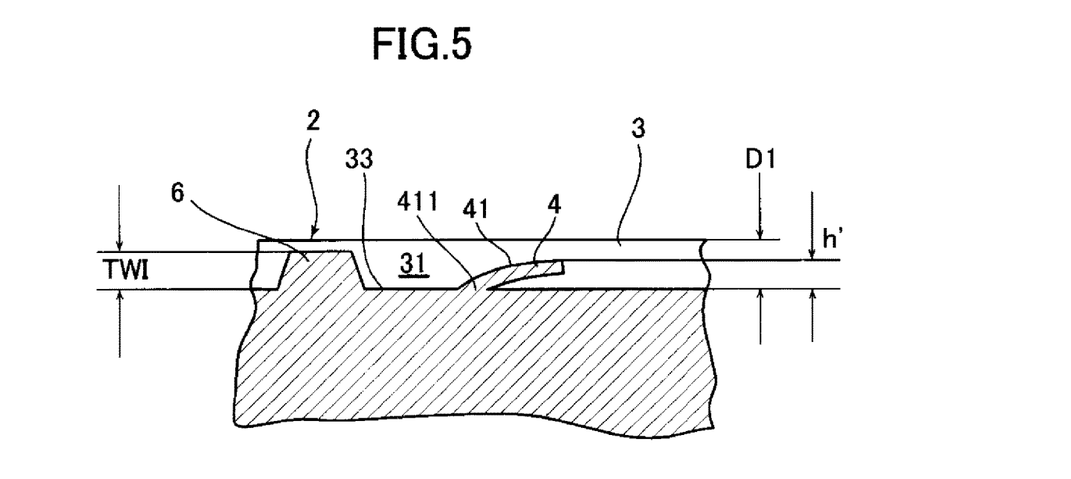
FIG. 5 is an enlargement in cross section of the pneumatic tire tread seen along the line III-III in FIG. 1 (the same view as in FIG. 3) schematically showing the state of the flexible fences during travel on a wet road surface when the depth of the tread part is approximately 75% worn.

FIG. 4 is an enlargement in cross section showing the situation when the pneumatic tire tread seen along the line III-III in FIG. 1 (the same view as in FIG. 3) is travelling on a wet road surface, and FIG. 5 is an enlargement in cross section of the pneumatic tire tread seen along the line III-III in FIG. 1 (the same view as in FIG. 3), FIG. 5 schematically showing the situation during travel on a wet road surface when the depth of the tread part is approximately 75% worn.

First of all, as shown in FIG. 4, when the tire is a new product in particular or wear is at the initial stage, the flexible fences 4 having the abovementioned inside portion 41 and outside portion 42 collapse or bend under the water pressure mainly generated by a fluid such as water passing through the main groove 3 during travel on a wet road surface, and as a result the height thereof is reduced to h' and this reduction in height opens the main portion of the main groove 3 and the water drainage properties are maintained.

Next, as shown in FIG. 5, when the tread part 2 is worn and the height thereof is reduced to the abovementioned height D1, the height of the flexible fences 4 also decreases to the same height D1, but even if a situation arises in which the height decreases in this way, the inside portion 41 having the average angle of inclination J1 which is greater than that of the outside portion 42 of the flexible fences 4 readily collapses or bends under water pressure mainly generated by a fluid such as water passing through the main groove 3. As a result, the height of the flexible fences 4 decreases to h' when they are subjected to water pressure, and this reduction in height enables the main portion of the main groove 3 to open and the water drainage properties are maintained up to the final stage of wear of the tread part 2.

Flexible fences such as these may be formed by a method such as that described in WO 2010/146180, for example.

The pneumatic tire tread according to a second mode of embodiment of the invention will be described next with the aid of FIG. 6.

Figure 6:
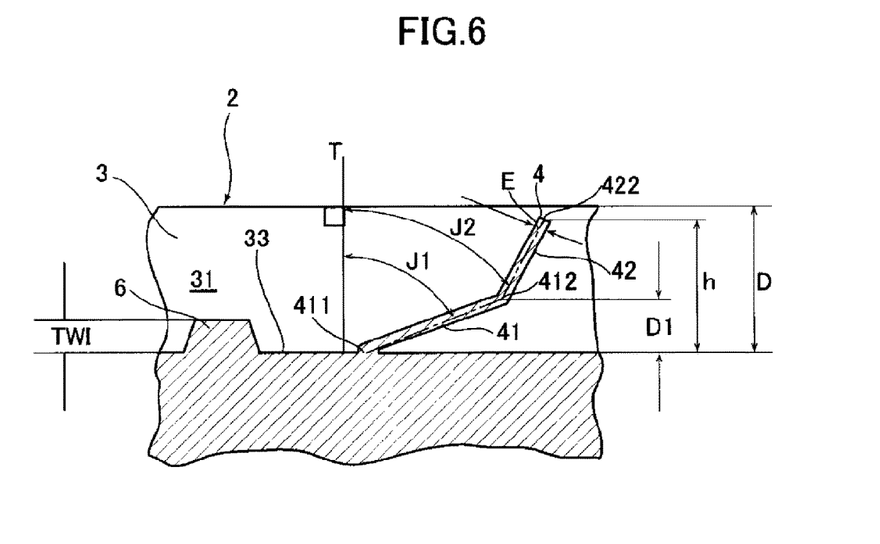
FIG. 6 is an enlargement in cross section to illustrate the flexible fences of the pneumatic tire tread according to a second mode of embodiment of the invention.

FIG. 6 is an enlargement in cross section of the pneumatic tire tread according to a second mode of embodiment of the invention, seen along a position corresponding to the line III-III in FIG. 1. The basic structure such as the shape and dimensions of the flexible fences 4 in this mode of embodiment is the same as that of the first mode of embodiment described above and this description will mainly relate to the differences in structure with the first mode of embodiment described above.

As shown in FIG. 6, the main groove 3 having the depth D is formed in the tread part 2 of the pneumatic tire 1, and in this mode of embodiment the flexible fences 4 comprise the inside portion 41 which has the end part (first end point) 411 connecting to the bottom surface 33 of the main groove 3, and the outside portion 42 radially outwards from a point (second end point) at the height D1 (predetermined height D1) from the bottom surface of the main groove 3, the same as in the first mode of embodiment. Furthermore, the inside portion 41 of the flexible fences 4 according to this mode of embodiment is provided in such a way that a straight line joining the first end point 411 and the second end point 412 has the average angle of inclination J1 with respect to a line T perpendicular to the surface of the tread part 2 in contact with the road surface. Meanwhile, the outside portion 42 of the flexible fences 4 is provided in such a way that a straight line joining the second end point 412 and a third end point 422 extends at an inclination with respect to the line T perpendicular to the surface of the tread part 2 in contact with the road surface, and in this mode of embodiment, said straight line has the average angle of inclination J2 shown in FIG. 6. In this mode of embodiment also, the average angle of inclination J1 of the inside portion 41 is provided in such a way as to be greater than the angle of inclination J2 of the outside portion 42, in the same way as in the first mode of embodiment. Furthermore, the average angle of inclination J2 of the outside portion 42 is set at less than 30°.

Specifically, the average angle of inclination J1 of the inside portion 41 in this mode of embodiment is 69° while the average angle of inclination J2 of the outside portion 42 is 20°, and the height D1 from the bottom surface 33 of the main groove 3 is 2.6 mm, which is less than 50% of the depth D of the main groove 3 and satisfies the relationship D1≤TWI+1 mm with respect to the height TWI of the wear indicator.

Furthermore, as shown in FIG. 6, in this mode of embodiment the connecting part 411 of the flexible fences 4 which connects to the bottom surface 33 of the main groove 3 is provided as a very short portion (attachment part) extending in the perpendicular direction such as to improve the mold-shaping properties during production.

The main action and effect of the pneumatic tire tread according to the second mode of embodiment of the invention will be described next. The action and effect of the pneumatic tire according to this mode of embodiment are essentially the same as those of the first mode of embodiment described above, and the action and effect particular to the second mode of embodiment will be mainly described here.

In this mode of embodiment, the outside portion 42 of the flexible fences 4 is also endowed with the average angle of inclination J2 with respect to a line T perpendicular to the surface of the tread part 2 in contact with the road surface, so good collapsing properties of the flexible fences 4 can be maintained from the initial stage of wear. Furthermore, even if the height of the flexible fences 4 decreases as wear progresses, the average angle of inclination J1 of the inside portion 41 is large, so the same effect can be achieved as when the flexible fences 4 are collapsed in advance, and as a result the flexible fences 4 can still adequately collapse at the final stage of wear under water pressure generated mainly by a liquid such as water passing through the main groove 3, and the water drainage properties of the main groove 3 can be more reliably maintained up to the final stage of wear while air column resonance is reduced.

Furthermore, the average angle of inclination J2 of the outside portion 42 is set at less than 30°, so it is possible to effectively obstruct the flow of air in the main groove 3, especially up to the initial stage of wear or an intermediate stage of wear of a new tire. Furthermore, it is possible to effectively restrict the generation of air column resonance in this way, and as described above, it is also possible to effectively make the flexible fences 4 readily collapse under the pressure of water inside the main groove 3.

The pneumatic tire tread according to a third mode of embodiment of the invention will be described next with the aid of FIG. 7.

Figure 7:
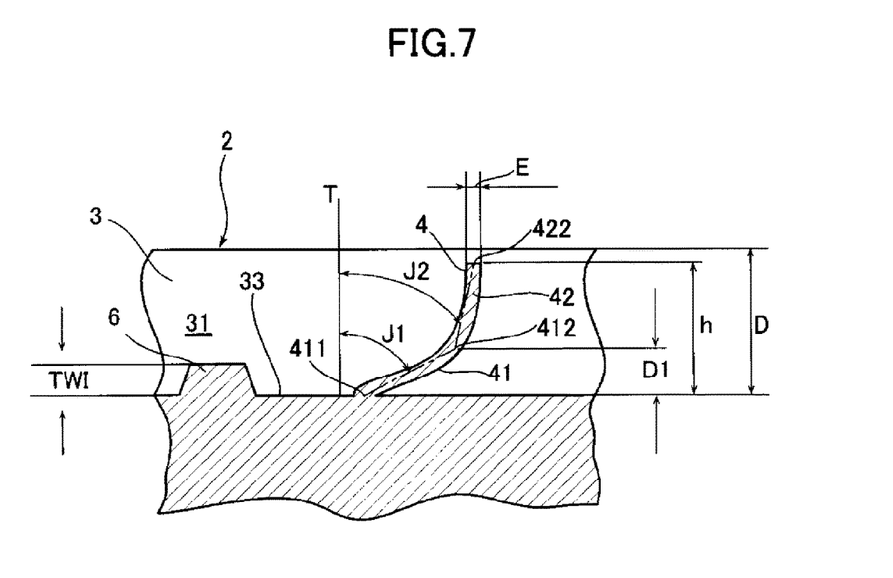
FIG. 7 is an enlargement in cross section to illustrate the flexible fences of the pneumatic tire tread according to a third mode of embodiment of the invention.

FIG. 7 is an enlargement in cross section of the pneumatic tire tread according to the third mode of embodiment of the invention seen along a position corresponding to the line III-III in FIG. 1. The basic structure such as the shape and dimensions of the flexible fences 4 in this mode of embodiment is the same as that of the first and second modes of embodiment described above and this description will mainly relate to the differences in structure with the first and second modes of embodiment described above.

As shown in FIG. 7, the main groove 3 having a depth D is formed in the tread part 2 of the pneumatic tire 1, and in this mode of embodiment the flexible fences 4 are constructed in such a way as to form a smooth curve overall (for instance, an arc, a parabola or a spline curve). In this mode of embodiment which utilizes such a curve, the flexible fences 4 also comprise the inside portion 41 having the end part (first end point) 411 which connects to the bottom surface 33 of the main groove 3, and the outside portion 42 radially outwards from a point (second end point) at the height D1 (predetermined height D1) from the bottom surface of the main groove 3.

Furthermore, the inside portion 41 of the flexible fences 4 according to this mode of embodiment is provided in such a way that a straight line joining the first end point 411 and the second end point 412 has an average angle of inclination J1 with respect to a line T perpendicular to the surface of the tread part 2 in contact with the road surface. Furthermore, the outside portion 42 of the flexible fences 4 is provided in such a way that a straight line joining the second end point 412 and the third end point 422 has an average angle of inclination J2 with respect to a line T perpendicular to the surface of the tread part 2 in contact with the road surface. In this mode of embodiment also, in the same way as in the first and second modes of embodiment described above, the average angle of inclination J1 of the inside portion 41 is provided in such a way as to be greater than the angle of inclination J2 of the outside portion 42. Furthermore, in the same way as in the second mode of embodiment, a very short attachment part extending in the perpendicular direction is provided on the connecting part 411 of the flexible fences 4 which connects with the bottom surface 33 of the main groove 3, in order to improve the mold-shaping properties during production.

The average angle of inclination J1 of the inside portion 41 in this mode of embodiment is 62° while the average angle of inclination J2 of the outside portion 42 is 23°, and the height D1 from the bottom surface 33 of the main groove 3 is 2.5 mm, which is less than 50% of the depth D of the main groove 3 and satisfies the relationship D1≤TWI+1 mm with respect to the height TWI of the wear indicator.

The main action and effect of the pneumatic tire tread according to the third mode of embodiment of the invention will be described next. The action and effect of the pneumatic tire according to this mode of embodiment are essentially the same as those of the first and second modes of embodiment described above, and the action and effect particular to the third mode of embodiment will be mainly described here.

In this mode of embodiment, even though the flexible fences are formed with a smooth curving shape, the average angle of inclination J1 of the inside portion 41 is set in such a way as to be greater than the average angle of inclination J2 of the outside portion 42, and therefore not only can good collapsing properties of the flexible fences 4 be maintained from the initial stage of wear in the same way as in the first and second modes of embodiment described above, the average angle of inclination of the inside portion 41 is also large even if wear progresses and the height of the flexible fences 4 decreases, so it is possible to achieve the same effect as when the flexible fences 4 are collapsed in advance, and as a result the flexible fences 4 can still adequately collapse in the final stage of wear under water pressure generated mainly by a fluid such as water passing through the main groove 3, and the water drainage properties of the main groove 3 can be more reliably maintained up to the final stage of wear while air column resonance is reduced.

Furthermore, by adopting an arc shape or parabola shape or the like, which is a smooth curving shape, for the flexible fences 4 as a whole, it is possible to reduce the stress exerted on the flexible fences 4 during mold-shaping when a pneumatic tire having flexible fences such as these is produced, so the productivity is improved.

The pneumatic tire tread according to a fourth mode of embodiment of the invention will be described next with the aid of FIG. 8.

Figure 8:
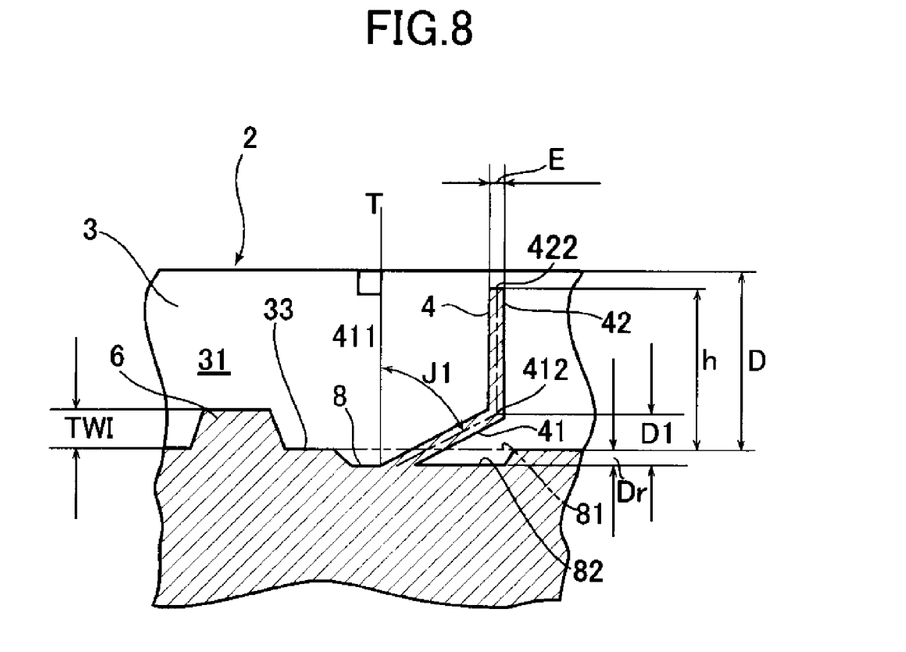
FIG. 8 is an enlargement in cross section to illustrate the flexible fences of the pneumatic tire tread according to a fourth mode of embodiment of the invention.

FIG. 8 is an enlargement in cross section of the pneumatic tire tread according to the fourth mode of embodiment of the present invention seen along a position corresponding to the line III-III in FIG. 1. The basic structure such as the shape and dimensions of the flexible fences 4 in this mode of embodiment is the same as that of the first to third modes of embodiment described above and this description will mainly relate to the differences in structure with the first to third modes of embodiment described above.

As shown in FIG. 8, the main groove 3 having a depth D is formed in the tread part 2 of the pneumatic tire 1, and a recessed part 8 having a depth Dr from the bottom surface 33 is further formed on the bottom surface 33 of the main groove 3. The recessed part 8 comprises an opening 81 which opens at the main groove 3 and a bottom part 82. The flexible fences 4 in this mode of embodiment have the same basic structure as those in the first mode of embodiment, while the end part (first end point) 411 of the inside portion 41 thereof is connected to the bottom part 82 of the recessed part 8, and the flexible fences 4 extend into the main groove 3 through the opening 81 of the recessed part 8.

The inside portion 41 of the flexible fences 4 is provided in such a way as to have an average angle of inclination J1 with respect to a line T perpendicular to the surface of the tread part 2 in contact with the road surface, in the same way as in the second mode of embodiment described above, the outside portion 42 of the flexible fences 4 is provided in such a way as to have the same average angle of inclination as a line T perpendicular to the surface of the tread part 2 in contact with the road surface (0°), and the average angle of inclination J1 of the inside portion 41 is provided in such a way as to be greater than the angle of inclination of the outside portion 42. Moreover, the flexible fences 4 may be constructed in the same way as in the first mode of embodiment or third mode of embodiment described above.

The average angle of inclination J1 of the inside portion 41 in this mode of embodiment is 62°, the height D1 from the bottom surface 33 of the main groove 3 is 1.5 mm, which is less than 50% of the depth D of the main groove 3 and satisfies the relationship D1≤TWI+1 mm with respect to the height TWI of the wear indicator, and the depth Dr of the recessed part 6 from the bottom surface 33 of the main groove 3 is 0.7 mm.

The main action and effect of the pneumatic tire tread according to the fourth mode of embodiment of the invention will be described next. The action and effect of the pneumatic tire according to this mode of embodiment are essentially the same as those of the first to third modes of embodiment described above, and the action and effect particular to the fourth mode of embodiment will be mainly described here.

The recessed part 8 comprising the opening 81 which opens at the bottom surface 33 of the main groove 3 is provided on the bottom surface 33 of the main groove 3 as in this mode of embodiment, and the flexible fences 4 are connected to the bottom part 82 of the recessed part 8 and extend into the main groove 3 through the opening 81 of the recessed part 8. By virtue of this configuration, the portion of the flexible fences 4 which bends by a large amount in the region of the connecting end part 411 when the flexible fences 4 collapse under fluid pressure can be brought closer to the bottom surface 33 of the main groove 3, even if the height thereof has been reduced as wear of the tread part 2 progresses. This means that when the flexible fences 4 collapse under fluid pressure, not only can the cross-sectional area over which water flows through the main groove 3 be more reliably maintained, the average angle of inclination of the inside portion 41 is also larger, so even if the height of the flexible fences 4 has decreased as a result of wear of the tread part 2, it is still possible to maintain a good level of collapse afforded by fluid pressure. It is therefore possible to more reliably maintain the water drainage properties of the main groove 3 up to the final stage of wear, while air column residence is reduced.

The pneumatic tire tread according to a fifth mode of embodiment of the present invention will be described next with the aid of FIG. 9.

Figure 9:
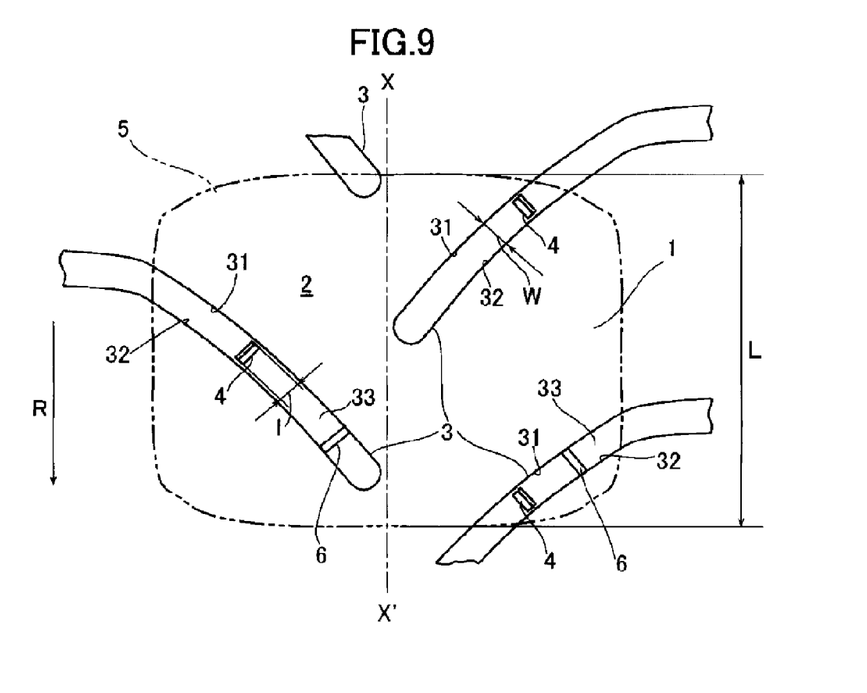
FIG. 9 is an enlargement in cross section to illustrate the flexible fences of the pneumatic tire tread according to a fifth mode of embodiment of the invention.

FIG. 9 schematically shows the pneumatic tire tread according to the fifth mode of embodiment of the invention. The basic structure such as the shape and dimensions of the flexible fences 4 in this mode of embodiment is the same as that of the first to fourth modes of embodiment described above and this description will mainly relate to the differences in structure with the first to fourth modes of embodiment described above.

As shown in FIG. 9, the reference symbol 1 denotes a pneumatic tire according to this mode of embodiment, the pneumatic tire 1 comprising a tread part 2, and a plurality of main grooves 3 having a width W and extending in an oblique direction with respect to the circumferential direction of the tire shown by XX' are formed in the tread part 2. The main grooves 3 have three surfaces, namely opposing wall surfaces 31, 32 and a bottom surface 33, and the bottom surfaces 33 of some of the main grooves 3 have a step-like wear indicator 6 provided in such a way as to reduce the depth of the main groove. The tire rotation direction of the tread part 2 is defined by the arrow R.

A flexible fence 4 having the width 1 is formed in each main groove 3 in such a way as to extend from the bottom surface 33 of the main groove 3, the configuration being the same as in the first to fourth modes of embodiment described above when the tire is viewed in cross section parallel to the direction in which the main grooves 3 extend and on a plane perpendicular to the surface of the tread part 2 in contact with the road surface, although this is not depicted (see FIGS. 3 and 6-8).

The plurality of flexible fences 4 in this mode of embodiment are all formed in such a way that the inside portion 41 thereof increases in height in the radial direction of the tire with respect to the bottom surface 33 of the main groove 3 in the opposite direction to the defined direction of rotation R of the tread part 2, in other words from the front side towards the rear in the defined direction of rotation R (not depicted).

It should be noted that when the average angle of inclination J2 of the outside portion 42 of the flexible fences 4 is set to be greater than 0°, as in the second and third modes of embodiment described above, the outside portion 42 is likewise also formed in such a way that the height thereof in the radial direction of the tire with respect to the bottom surface 33 of the main groove 3 increases from the front side towards the rear in the defined direction of rotation R.

That is to say, in this mode of embodiment, the average angles of inclination J1, J2 of the inside portion 41 and/or outside portion 42 of the flexible fences 4 are formed in such a way as to be angled from the front side towards the rear in the defined direction of rotation R.

It should be noted that in the first mode of embodiment described above with the two main grooves 3 shown in the example in FIG. 1, the orientations of the angles of the flexible fences 4 are set as different orientations in one main groove 3 and the other main groove 3, and a certain effect is also demonstrated in a tread part 2 in which the tire rotation direction is undefined. It should be noted, however, that if the tire rotation direction is defined in the case of a pneumatic tire tread having main grooves 3 as shown in the example in FIG. 1, all of the flexible fences 4 are preferably formed in such a way that the height of the inside portion 41 and/or outside portion 42 in the radial direction of the tire with respect to the bottom surface 33 of the main groove 3 increases from the front side towards the rear in the defined direction of rotation R, in other words they are formed in such a way as to be inclined with the same orientation.

The main action and effect of the pneumatic tire tread according to the fifth mode of embodiment of the invention will be described next. The action and effect of the pneumatic tire according to this mode of embodiment are essentially the same as those of the first to fourth modes of embodiment described above, and the action and effect particular to the fifth mode of embodiment will be mainly described here.

In this mode of embodiment, the tread part 2 has the defined direction of rotation R and the height from the bottom surface 33 of the main groove 3 of the inside portion 41 of the flexible fences 4 provided in each main groove 3 is formed in such a way as to increase in the opposite direction to the defined direction of rotation R, in other words from the front side towards the rear in the defined direction of rotation R, and as a result the direction of fluid flow inside the main groove 3 is made to coincide with the preset direction of inclination of the inside portion 41 and/or outside portion 42 of the flexible fences 4, so the direction of collapse of the flexible fences 4 can be made to coincide with the direction of fluid flow. This means that even if the height of the flexible fences 4 is reduced as a result of wear of the tread part 2, it is still possible to maintain a good level of collapse afforded by fluid pressure, so the water drainage properties of the main groove 3 can be more reliably maintained up to the final stage of wear while air column resonance is reduced.

It should be noted that the following variant examples of the modes of embodiment described above are feasible provided that the abovementioned action is achieved: the inside portion 41 and/or the outside portion 42 of the flexible fences 4 may be further split into portions having different shapes, for example the inside portion 41 which is on a straight line shown in FIG. 3 may be curved while the outside portion 42 may be set as a straight line; the shape along the width 1 (cross-sectional shape) may be formed as an undulating shape in such a way as to collapse under water pressure and generate suitable ground pressure with the road surface; small protrusions for regulating the difficulty of bending of the flexible fences 4 (flexural rigidity) may be provided on a surface of the flexible fences 4 seen from the lengthwise direction (viewed from the front) of the main groove 3; or another shape such as a rectangular or trapezoidal shape having rounded corners when viewed from the front may be formed.

Particularly preferred modes of embodiment of the invention have been described above, but the invention is not limited to the modes of embodiment shown in the figures and the invention can be implemented in various modes.

Next, FIG. 10 is an enlargement in cross section of a pneumatic tire tread provided with conventional flexible fences, schematically showing the situation during travel on a wet road surface when the depth of the tread part is about 60% worn. The tire size in FIG. 10 is the same as for the pneumatic tire tread in the first mode of embodiment.

In the example shown in FIG. 10, the end part 141 of a flexible fence 104 is connected to the bottom surface 133 of a main groove 103 having wall surfaces 131, the flexible fence 104 being provided in such a way as to extend at an angle perpendicular to the surface of a tread part 102 in contact with the road surface. It should be noted that the reference symbol 106 denotes a wear indicator.

As shown in FIG. 10, the height of the flexible fence 104 is worn down to D1 as a result of wear of the tread part, but the flexible fence 104 in this example does not comprise an inside portion and an outside portion as in the modes of embodiment described above, so the flexible fence 104 does not readily collapse in the vicinity of the connecting end part 141 and it can be understood that the flexible fence 104 does not readily collapse under the pressure of a fluid passing through the main groove 103 in the final stage of wear.

Exemplary Embodiment

In order to explain the effect of the invention more clearly, pneumatic tire treads according to a conventional example provided with conventional flexible fences and a pneumatic tire tread according to Exemplary Embodiment 1 (first mode of embodiment) of the invention will be described in regard to a verification test carried out using a simulation (finite element method) employing commercial computer software.

Models of the two types of pneumatic tire treads according to the conventional example and Exemplary Embodiment 1 were both provided with a main groove having a depth of 8.0 mm and a width of 14.5 mm in a new product formed from the same rubber-based material, the models being formed in such a way that flexible fences having a thickness of 0.6 mm were connected to the bottom surface of the main groove, and the fluid pressure required in order to cause adequate collapse of the flexible fences inside the main groove in a new product and with the remaining groove depth reduced to 2.0 mm was measured for each.

The fluid pressure calculated is expressed as an index taking the conventional example as 100; the greater the numerical value, the better the result (greater ease of collapse).

TABLE 1

| | Conventional Example | Exemplary Embodiment |
|---|---|---|
| Fluid pressure causing collapse of flexible fences (new product/index) | 100 | 101 |
| Fluid pressure causing collapse of flexible fences (worn product/index) | 100 | 125 |

As shown in table 1, it can be confirmed that the article according to the exemplary embodiment had good water drainage properties up to the final stage of wear of the tread part, and it is clear that the configuration of the pneumatic tire tread of the first to fifth modes of embodiment described above makes it possible to effectively achieve both water drainage properties and a reduction in air column resonance in the main groove.

KEY TO SYMBOLS

1 Pneumatic tire tread
2 Tread part
3 Main groove
31 Opposing wall surface of main groove
32 Opposing wall surface of main groove
33 Bottom surface of main groove
4 Flexible fence
41 Inside portion of flexible fence
42 Outside portion of flexible fence
411 Connecting part of inside portion with bottom surface of main groove, end edge part (end part), first end point
412 Point of predetermined height D1, second end point
422 Outermost end edge part (end part) of outside portion in higher radial direction, third end point
5 Tread footprint
6 Wear indicator
8 Recessed part of bottom surface of main groove.

The invention claimed is:

1. A tire tread for a pneumatic tire comprising:
a tread part which comes into contact with a road surface when the tire is rolling, wherein is formed at least one main groove having a bottom surface and two opposing wall surfaces and having a depth D and a width W, and
a plurality of flexible fences having a thickness E which extend inside the main groove in the radially outwards direction of the tire in such a way as to obstruct at least 70% of the cross-sectional area of the main groove and in such a way as to lie at a distance from the wall surfaces from the bottom surface of the main groove, the flexible fences being disposed at intervals such that at least one of said flexible fences is present inside the main groove within the tread footprint when the tire is rolling,
wherein the plurality of flexible fences comprise an inside portion having an end edge part which is connected to the bottom surface of the main groove, and an outside portion which is radially outside a predetermined height D1 from the bottom surface of the main groove, and the average angle of inclination of the inside portion with respect to a line perpendicular to the surface of the tread part in contact with the road surface is greater than the average angle of inclination of the outside portion with respect to a line perpendicular to the surface of the tread part in contact with the road surface, when viewed in cross section parallel to the direction in which the main groove extends and on a plane perpendicular to the surface of the tread part in contact with the road surface, and wherein the thickness E is substantially constant.

2. The tire tread according to claim 1, wherein the average angle of inclination of the inside portion of the flexible fences with respect to a line perpendicular to the surface of the tread part in contact with the road surface is greater than 60°.

3. The tire tread according to claim 1, wherein the predetermined height D1 from the bottom surface of the main groove is less than 50% of the depth D.

4. The tire tread according to claim 1, wherein a wear indicator indicating the wear limit is further formed on the bottom surface of the main groove, and the predetermined height D1 from the bottom surface of the main groove is set in such a way as to satisfy the relationship D1≤TWI+1 mm, where TWI is the height of the wear indicator.

5. The tire tread according to claim 1, wherein the average angle of inclination of the outside portion of the flexible fences with respect to a line perpendicular to the surface of the tread part in contact with the road surface is less than 30°.

6. The tire tread according to a claim 1, wherein the average angle of inclination of the outside portion of the flexible fences with respect to a line perpendicular to the surface of the tread part in contact with the road surface is 0°.

7. The tire tread according to claim 1, wherein a plurality of recessed parts having an opening which opens at the main groove are further formed in the bottom surface of the main groove, and the inside portion of the plurality of flexible fences is formed in such a way as to be connected to the plurality of recessed parts on the bottom surface of the main groove and in such a way as to extend into the main groove through the opening of the recessed parts.

8. The tire tread according to claim 1, wherein the thickness E of the flexible fences is between 0.3 mm and 2.0 mm.

* * * * *